July 28, 1931.  W. A. DENEHIE  1,816,041
REMOVABLE BODY MECHANISM FOR TRUCKS
Filed April 12, 1929   3 Sheets-Sheet 2
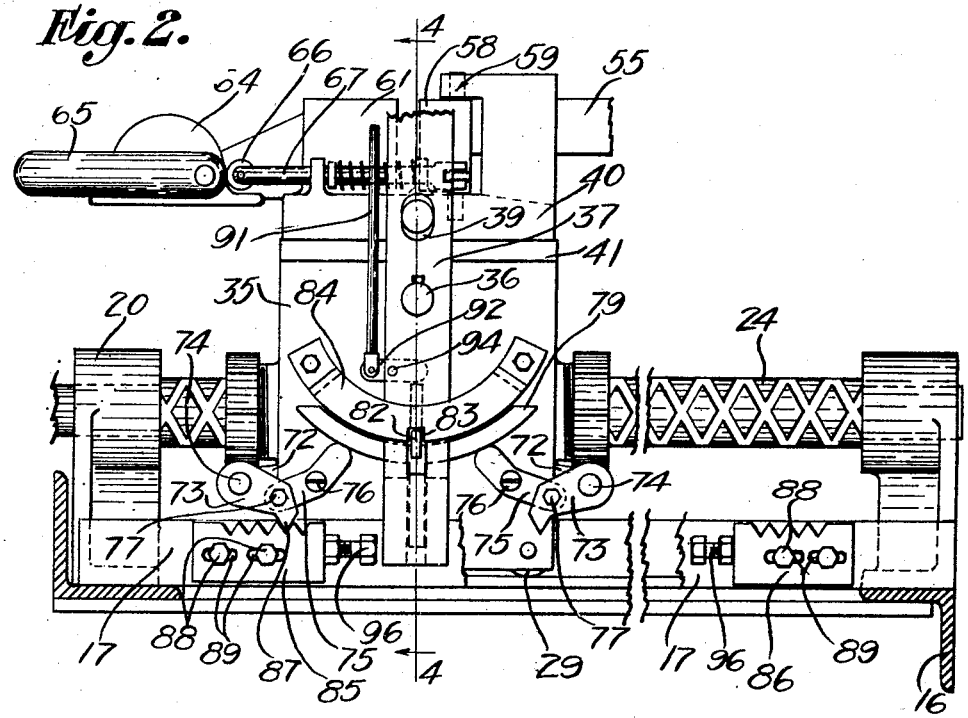
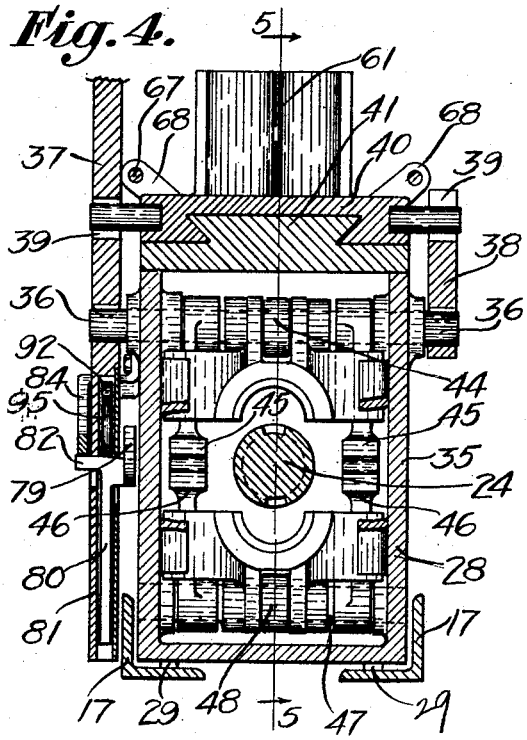
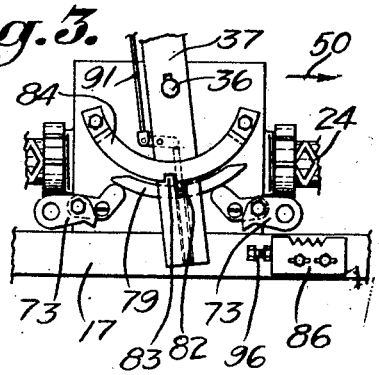
INVENTOR:
WILLIAM AUSTIN DENEHIE,
ATTORNEY.

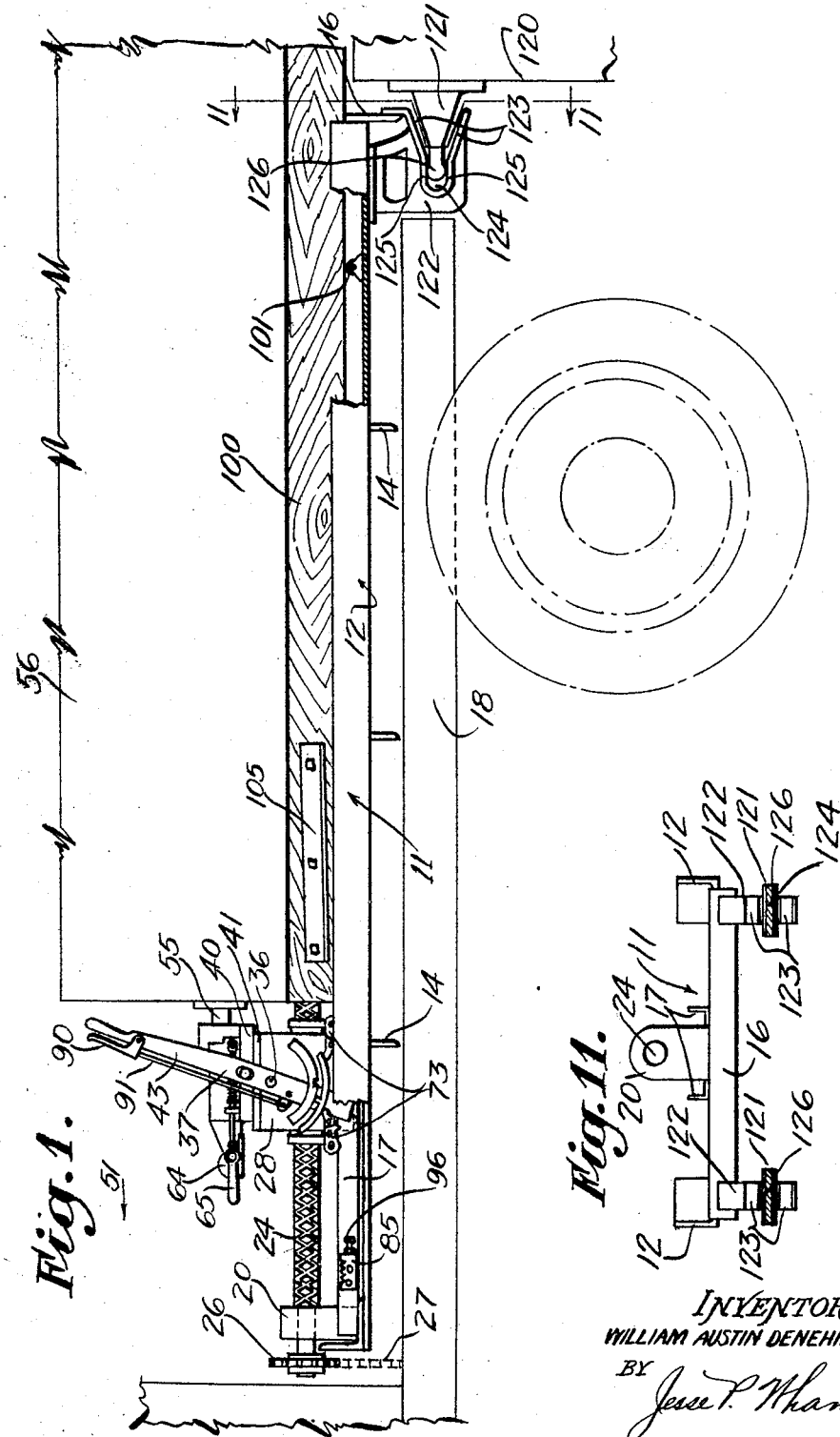

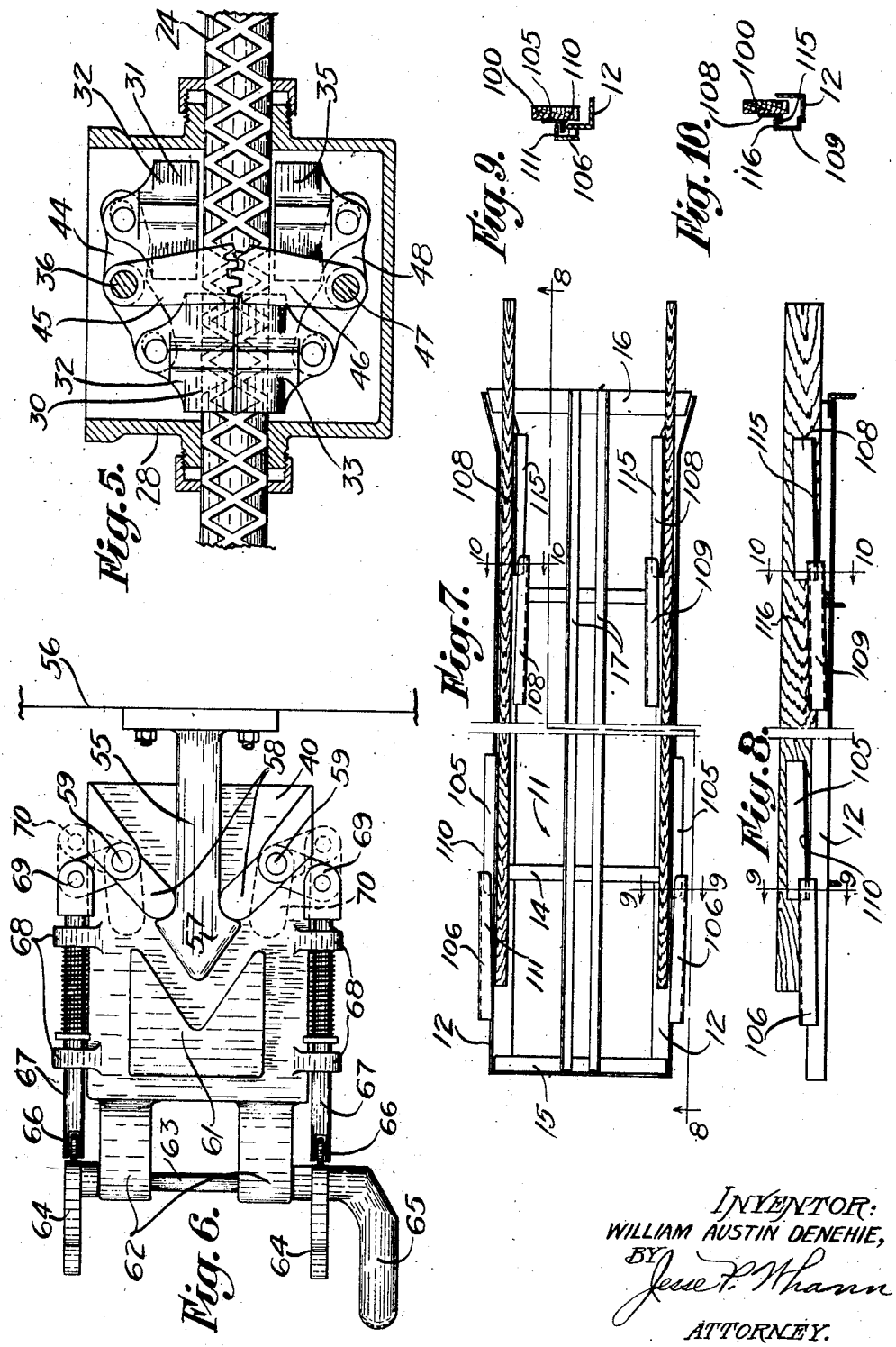

Patented July 28, 1931

1,816,041

UNITED STATES PATENT OFFICE

WILLIAM AUSTIN DENEHIE, OF LOS ANGELES, CALIFORNIA

REMOVABLE BODY MECHANISM FOR TRUCKS

Application filed April 12, 1929. Serial No. 354,682.

This invention relates to devices for the loading and unloading of vehicles, and relates particularly to a device whereby a removable body may be moved from a platform to a truck or from a truck to a platform; and this application is supplementary to U. S. Letters Patent No. 1,448,057 for removable-body mechanism for trucks, granted to me Mar. 13, 1923.

It is an object hereof to produce a simple and effective apparatus whereby a removable body may be moved from a platform onto a truck by power supplied from and applied through mechanism attached to the truck and securely locked in place for transportation, such locking means operating in conjunction with the loading mechanism in such a manner as to be automatically locked when the body has been loaded onto the truck and unlocked previous to the operation of unloading from the truck to a platform.

A further object of the invention is to provide apparatus of the character described including means for guiding the removable body during its movement by the loading and unloading mechanism, and means for preventing a relative movement of the removable body relative to the truck during transportation.

Another object is to provide a mechanism of this character in which the apparatus for moving the removable body is completely separate from and may be readily attached to any truck of a size to receive same.

Other objects and advantages will be made evident hereinafter and with reference to the drawings, in which a simple embodiment of the invention is shown for illustrative purposes only, and in which, Fig. 1 is a partly sectioned elevational view showing my body loading mechanism and its relative position on the chassis of a truck, and a truck body partly moved thereonto.

Fig. 2 is an enlarged elevation of the travelling head at the inner end of its travel, the control lever thereof being shown in the neutral position which it assumes when at rest at the end of its travel.

Fig. 3 is a fragmentary view showing the head approaching the outer end of its travel.

Fig. 4 is a section taken substantially on the plane indicated by the line 4—4 of Fig. 2.

Fig. 5 is a section through the case of the travelling head on a plane represented by the line 5—5 of Fig. 4.

Fig. 6 is a plan view of the sliding plate which is located at the top of the travelling head.

Fig. 7 is a plan view of the supporting frame of the body handling device, with the screw and head removed therefrom and showing the body sills in their relative positions when the body is nearly fully on the supporting frame of the handling mechanism.

Fig. 8 is an elevation corresponding to Fig. 7, the rear end thereof being shown in section as indicated by the line 8—8 of Fig. 7.

Fig. 9 is a section on the plane represented by the line 9—9 of Fig. 8, but with the hold-down means fully engaged.

Fig. 10 is a section on the plane represented by the line 10—10 of Fig. 8, but with the rear hold-down means fully engaged.

Fig. 11 is a rear end view of the supporting frame, with parts in section substantially as indicated by the line 11—11 of Fig. 1.

For the purpose of simplicity in presenting my invention I have illustrated a single form thereof. In Figs. 1, 7 and 8 of the drawings 11 indicates a base or supporting frame consisting of side track members in the form of structural angles 12 secured together by cross angles 14, 15 and 16, which support a central track consisting of smaller angles 17, longitudinally placed as shown. This frame 11 is an individual unit capable of attachment to the chassis 18 of a truck diagrammatically illustrated in Fig. 1 of the drawings. On the front cross angle 15, in position between the forward ends of the central track angles 17, a bearing block 20 is situated, and on the rear angle 16, in position between the rearward ends of the central track angles 17, a rear bearing block is mounted, these bearing blocks being shown in Figs. 1 and 2. Extended between these bearing blocks 20 and 21 and journaled therein, is a shaft 24 having a right and left thread system 25 and being driven by suitable connection with the power unit of the truck, such as indicated by the sprocket 26 and chain 27.

A travelling head 28 having small wheels 29 which engage the angles 17, is propelled by the shaft 24 through engagement of either the off split nut 30 or the on split nut 31, which are shown in Fig. 5, and each of which include an upper nut half-portion 32 and a lower half-portion 33. Laterally through the upper part of the case 35 of the travelling head 28 there extends a shaft 36, as shown principally in Fig. 4, having levers 37 and 38 keyed on the outer ends thereof, both of which levers are slotted at 39 for engagement with pins which extend from the sliding plate 40 which is carried on the slide member 41 which forms the cover for the case 35. As shown in Fig. 1, the lever 37 has an upwardly extending portion 43 forming an operating handle through which the shaft may be partly rotated in either direction for the purpose of swinging the rocker beam 44 which is keyed thereon either in a direction to cause the upper portion 32 of the split nut 30 to lower into engagement with the shaft 24, or in the opposite direction to cause the upper portion of the split nut 31 to lower into engagement with the shaft 24. Gear segments 45 extend downwardly from the shaft 36, to which they are keyed, within the case 35 into engagement with upwardly extending gear segments 46 secured near the ends of a lower shaft 47 which is journaled in the case 35 and carries a rocker beam 48 having the lower half-portions 33 of the split nuts 30 and 31 on its respective ends. The co-operating mechanism just described functions to produce an engagement of the split nut 30 with the shaft 24 when the lever 37 is swung to the left as shown in Fig. 3, which causes the head 28 to travel in the right hand or off direction indicated by the arrow 50, or to produce an engagement of the split nut 31 with the shaft 24 when the lever is swung to the right as shown in Fig. 1, which causes the head 28 to travel in the left hand or on direction as indicated by the arrow 51 of the Fig. 1.

The draft bar 55 which is secured to the body 56 indicated in Fig. 1 and Fig. 6, has a head 57 thereon which enters between latch-dogs 58 mounted on vertical hinge pins 59 on the slide plate 40. These latch-dogs 58 engage behind the head 57 when the travelling head is moving in the on direction indicated by the arrow 51 of Fig. 1, in the manner illustrated in Fig. 6, thus pulling the body in the left hand direction which in this instance is onto the truck chassis. When the lever 37 is swung in a right hand direction to produce a travel of the head 28 in the direction of the arrow 51, the sliding plate 40 is moved also in a right hand direction on the slide member 41, and the reaction of the body 56 to the pull of the head 28 holds the slide plate 40 in the position in which it is shown in Fig. 1, with considerable force, with the result that the split nut 31 is held firmly engaged with the shaft 24; this same condition applying with regard to the nut 30 when the body 56 is being removed from the truck, with the exception that when the head 28 is travelling in right hand direction, the head 57 of the draft bar 56 engages a lug or anvil 61 which projects upwardly from the sliding plate 40, holding the sliding plate 40 in leftward direction relative to the travelling head 28.

Projecting rearwardly from the sliding plate 40 are brackets 62 for supporting a shaft 63 carrying cams 64 and an operating handle 65. These cams 64 engage rollers 66 in the ends of slide rods 67 which are supported in lugs 68 extending laterally from the slide plate 40 and connect at their rearward ends bell crank connections or extensions associated with the left hand latch-dogs 58 as indicated at 69, so that by rotating the handle 65 in clock-wise direction the cams may be caused to force in the slide rods 67 whereby to swing the latch-dogs 58 into releasing positions as indicated by the dotted lines 70 of Fig. 6.

On lugs 72 which extend longitudinally from the travelling head 28, latch levers 73 are pivoted at 74, and are raised or allowed to lower by lifting levers 75 which hinge upon screws 76 and engage the latch levers 73 at 77, as shown in Fig. 2. The inner ends of the lifting levers 75 are engaged by a cam segment 79, which is formed on a slide bar 80 carried in the lower end 81 of the lever 37 and extends between the lever 37 and the face of the travelling head 28. The forwardly projecting lug 82 of the cam segment 79 is arranged to engage a notch 83 in a sector plate 84 secured to the face of the travelling head when the lever 37 is in central position and the split nuts 30 and 31 are both disengaged from the shaft 24. When the lug 82 is in the notch 83, the cam segment 79 is in raised position and the latch levers 73 are allowed to drop into the lowered positions in which they are shown in Fig. 2, in which positions they may engage the respective lock blocks 85 or 86, depending whether the travelling head is at the inner or outer end of its travel on the supporting frame 11. In Fig. 2 the point 87 of the leftward latch lever 73 is shown in engagement with the inner lock block 85 having notches cut in the upper face thereof for this purpose. The blocks 85 and 86 are adjustably secured to the angles 17 by screws 88 which pass through slotted openings 89 in the blocks 85 and 86, so that the longitudinal positions of the lock blocks may be varied as conditions may require.

In Fig. 2 the travelling head 28 is shown in its position of rest at the inner end of the supporting frame 11, the operating lever thereof being in central position so that the split nuts 30 and 31 are disengaged from the shaft 24 and the latch lever 73 engages the lock block 85. If it is desired to remove the body from the truck by causing the head 28 to move in rightward direction, the latch grip 90 at the upper end of the lever 37 is depressed to raise the connecting rod 91, Figs. 1 and 2, which rotates a horizontal member 92 on its fulcrum pin 94 so as to force downwardly on a pin 95 extending upwardly from the cam segment 79, with the result that the cam segment is moved downwardly and the lug 82 is removed from engagement from the notch 83, whereupon the upper end 43 of the lever 37 is swung in leftward direction so that the lever 37 then assumes the position in which it is shown in Fig. 3, the lifting levers 75 being also depressed at this time so as to raise both of the latch levers 73. The swinging of the lever 37 as described and the raising of the latch levers 73 is accompanied by an anticlockwise partial rotation of the shaft 36 which, as previously described, results in the closing of the split nut 30 on the shaft 24 whereupon the co-operating thread system of the split nut 30 and the shaft 24 functions to move the travelling head 28 in the rightward direction, providing the shaft 24 is at this time in rotation. Projecting from the lock block 86 is a stop screw 96 which is engaged by the lower end 81 of the lever 37 as the head 28 approaches the end of its travel, and which stop screw 96 returns the lever 37 to neutral position, thereby opening the split nut 30 so as to stop the travel of the head 28 and to drop the rightward latch lever 73 into engagement with the lock block 86, it being preferable to have the latch levers 73 held in engagement with their co-operative lock blocks by any of the common forms of resilient means such as springs. The truck body may now be released from the travelling head by opening the jaws 58, through operation of the lever 65, so as to free the head 57 of the draft bar 55. It will be understood that the loading of a truck body onto the truck is accomplished by engaging its draft bar with the traveling head and then swinging the lever 37 in rightward direction so as to engage the split nut 31 with the shaft 24, whereupon the truck body will be pulled onto the supporting frame 11 mounted on the chassis of the truck.

I have previously described means for locking the travelling head at the two extremes of its travel, this making it possible to lock the truck body against longitudinal movement. In addition to this I provide means for locking the truck body against vertical and lateral movement. In the preferred practice of the invention, the truck body 56 is equipped with longitudinal sills 100, which are preferably parallel and engage rollers, such as shown at 101, in Fig. 1, which are mounted on the side angles 12 of the supporting frame 11. In Figs. 7 and 8 the sills 100 are shown in their relative positions as the vertical and lateral clamping means are just entering engagement, such means consisting of forward interengaging members 105 and 106 and rearward interengaging members 108 and 109. The members 105 may conveniently consist of angles, as shown, with their lower legs extending outwardly from the forward ends of the sills 100, these outstanding legs 110, as shown in Fig. 9, being in position to pass under the inwardly extending legs 111 of the angles which form the members 106, spacing means 112 being employed for supporting the members 106 in position on the side angles 12. The members 105 and 106 are sloped inwardly and downwardly so that a double acting wedging action is accomplished to centralize the front end of the truck body and to prevent any lateral movement, and to wedge the sills 100 tightly down relative to the side angles 12 which are firmly secured to the truck chassis. In a like manner, the members 108 may conveniently be formed of angles secured to the rearward ends of the sills 100 on the inner faces thereof with their lower legs 115 extending inwardly as shown in Fig. 10, and in such position being arranged to extend under the outwardly projecting legs 116 of the angles mounted on the frame 11 to serve as members 109, in positions within but adjacent to the side angles 12. These members 108 and 109 are sloped outwardly and downwardly to accomplish a compound wedging action for centralizing the rearward end of the truck body and preventing all lateral movement, and for wedging the rearward end of the truck body down relative to the frame 11 so as to prevent vertical movement or vibration of the truck body when the truck is in operation.

The invention further provides means for levelling the truck relative to the truck platform 120, Fig. 1 irrespective of whether the truck body is loaded or unloaded, or whether it is unevenly loaded. On the face of the platform 120 is a projecting structure 121 defining a horizontal plane, and under the rear end of the frame 11 is a co-operating structure 122 having a mouth 123 leading into a pocket 124 having horizontal parallel side walls 125. As the truck is backed up against the platform 120, the enlarged portion 126 of the projecting structure 121 enters the converging mouth 123 of the co-operating structure 122, and as the truck comes to rest the pocket 124 encloses the enlargement 126, thus assuring the bringing of the rear end of the truck frame 11 to a predetermined level relative to the platform 120. Vertical forces applied to the structure 122 due to the weight on or lifting of the chassis of the truck cannot move the truck away from the platform owing to the engagement of the outer end 126 of the structure 121 by the non-sloping side walls 125 of the pocket 124.

The latch levers 73 as previously described, are adapted to swing downwardly into positions in which they will engage their respective notched blocks 85 and 86, and in order to operate in this manner may be made of such weight that they will normally assume downwardly swung positions, the weight thereof also being sufficient to swing the members 75 in such direction that the segment 79 will be normally lifted so as to make engagement with the notch 83 through use of the lug 82 with which the segment is provided for such purpose of engagement. Or, as an alternative to this use of weight for the purpose of operating the latch levers 73 and supporting the cam segment 79, any of the well known spring means may be applied to the latch levers 73, or to the shaft elements 74 on which the latch levers 73 would in such case be keyed or pinned, in a manner to normally force the latch levers 73 downwardly with sufficient pressure to hold them in operative engagement with their respective notched blocks 85 and 86.

It is to be understood that the engagement at 77 of the latch levers 73 with the lifting levers 75, is of such looseness as to permit operation of these members on their pivots in the manner described, it being preferable to use the well known sliding engagement formed by a pin or shaft of a screw passing through an elongated hole or slot.

I claim as my invention:

1. In apparatus of the class described: a truck having a longitudinally movable head and being adapted to receive a body; means for moving said head; an attachment between said head and said body for moving said body on and off of said truck; and locking means operative between said head and said truck engaging at the extremity of the travel of said head for preventing longitudinal movement thereof.

2. In apparatus of the class described: a truck having a longitudinally movable head and being adapted to receive a body; means for moving said head; an attachment between said head and said body for moving said body on and off of said truck; locking means operative between said head and said truck, engaging at the extremity of the travel of said head for preventing longitudinal movement thereof; and means engaging between said body and said truck for preventing vertical and lateral movement of said body.

3. In apparatus of the class described: a truck frame having a longitudinally movable head; co-operative means for moving said head; a lever device for moving said co-operative means between operative and inoperative positions; locking means co-operative between said head and said frame for preventing movement of said head relative to said frame when said head is in intended stationary positions; and mechanism operating in conjunction with said lever device, said mechanism having a cooperative locking part for engaging said locking means when said lever device is in its relative inoperative position and for disengaging said locking means when said lever device is in its relative operative position.

4. Apparatus as defined in claim 3, including: a truck body; an attachment between said head and said body whereby said body will be moved on and off said frame by said head; and automatically engaging means operating at the end of the on travel of said body for securing said body on said truck.

5. Apparatus as defined in claim 3, including: a truck body; an attachment between said head and said body whereby said body will be moved on and off said frame by said head; and slide members acting downwardly and inwardly, engaging at the end of the on travel of said body whereby to secure said body against vertical and lateral movement.

6. Apparatus as defined in claim 3, in which said mechanism includes a circular cam segment mounted on said lever adapted for extended position so as to operate said locking means when said lever device is in its relative inoperative position.

7. Apparatus as defined in claim 3, including means for locking said lever device in its relative inoperative position.

8. In apparatus of the class described: a truck frame having a longitudinally movable head; co-operative means for moving said head; a lever device for moving said co-operative means between operative and inoperative positions; a ratchet plate mounted on said frame and adapted to be engaged when said movable head is at an extreme of its travel; a dog for engaging said ratchet plate, said dog being connected to said head; and operating means for moving said dog to and from engagement with said ratchet plate.

9. In apparatus of the class described: a truck frame having a longitudinally movable head; co-operative means for moving said head; a lever device for moving said co-operative means between operative and inoperative positions; a ratchet plate mounted on said frame and adapted to be engaged when said movable head is at an extreme of its travel; a dog for engaging said ratchet plate, said dog being connected to said head; and means connecting said dog with said lever device so that said dog will engage said ratchet plate when said lever device is in its relative inoperative position and so that said dog will disengage said ratchet plate when said device is in its relative operating position.

Signed at Los Angeles, in the county of Los Angeles and State of California, this 15th day of March, 1929.

WILLIAM AUSTIN DENEHIE.